June 3, 1952  F. E. LATHE  2,599,184
MAGNESIA-ALUMINA-SILICA REFRACTORIES
Filed Dec. 24, 1949  2 SHEETS—SHEET 1
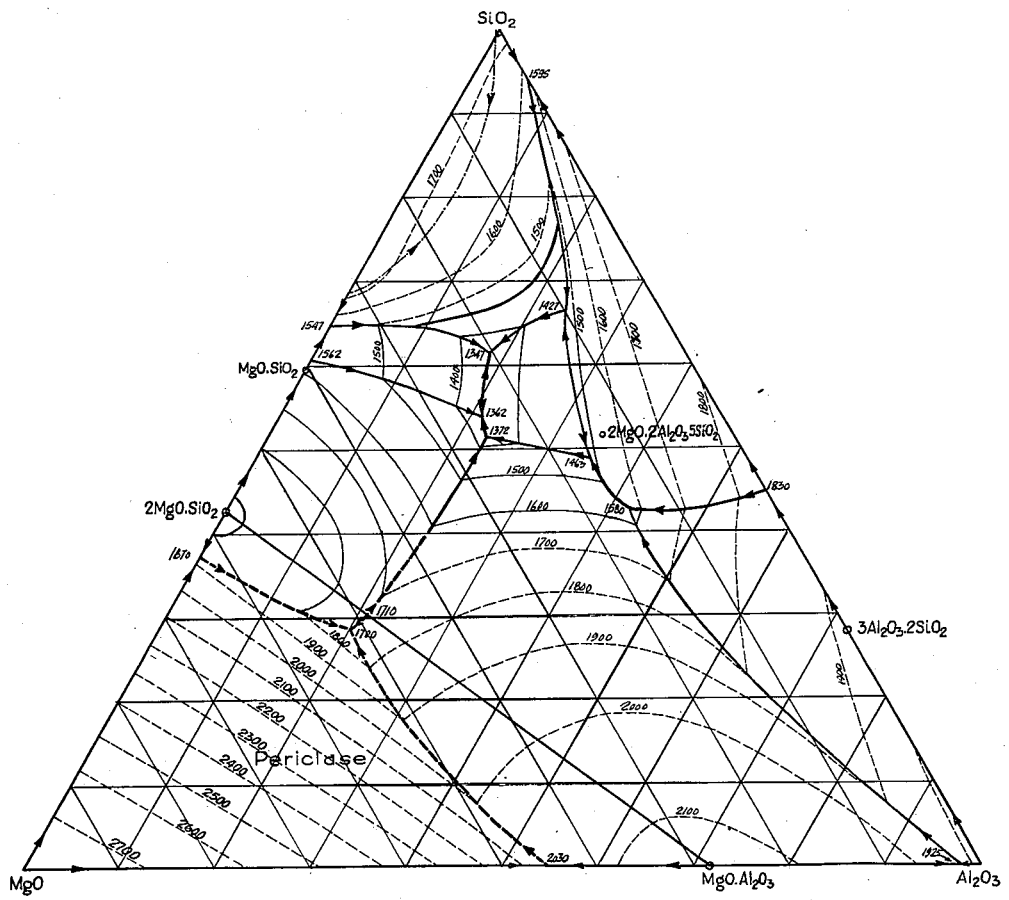
FIG·1
Frank E. Lathe
INVENTOR.
BY Alex E. MacRae
Attorney.

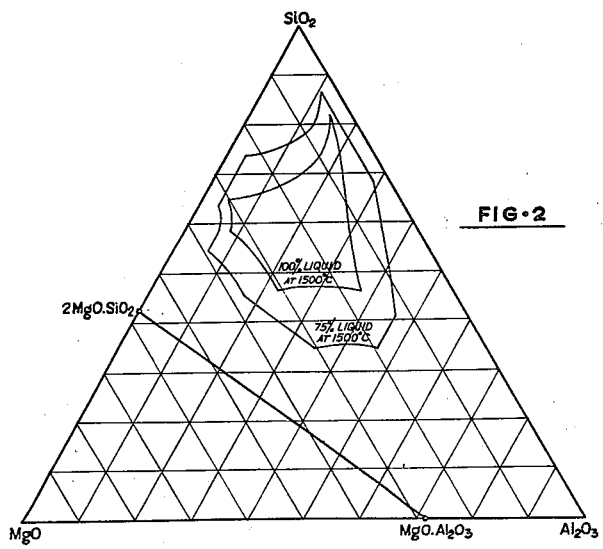
FIG·2
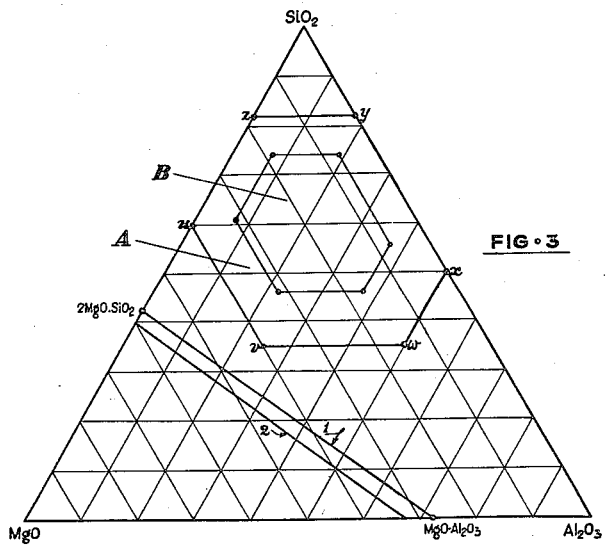
FIG·3

Patented June 3, 1952

2,599,184

UNITED STATES PATENT OFFICE 2,599,184

MAGNESIA-ALUMINA-SILICA REFRACTORIES

Frank E. Lathe, Ottawa, Ontario, Canada, assignor to Canadian Refractories Limited, Montreal, Quebec, Canada, a corporation of Canada Application December 24, 1949, Serial No. 134,930

17 Claims. (Cl. 106—62)

This invention relates to a method of consolidating granular particles of refractory material, at a temperature lower than heretofore possible, into a highly refractory and mechanically strong or load-bearing product, which consists essentially of magnesia and silica and for most applications contains an appreciable amount of alumina.

In accordance with the present invention granular particles of refractory material containing a total of at least 80% by weight of magnesia, silica and alumina, and in which the weight ratio of magnesia to silica and alumina is at least equivalent to 1.5 times the silica plus 0.5 times the alumina, are mixed with a relatively non-refractory material, preformed or natural, containing at least 75% by weight of magnesia, silica and alumina, of which substantially 35 to 82% is silica, 0 to 40% is magnesia, and 0 to 50% is alumina. It will be observed from the magnesia-alumina-silica phase equilibrium diagram which accompanies this application (Figure 1) that complete reaction between the above components of the non-refractory material, within the limits of composition given, leads in every case to the formation of low-melting silicates, with no magnesia present as periclase. This is essential in order that the non-refractory constituent will form a substantial body of liquid at a temperature of 1500° C. or less. The refractory and non-refractory constituents are mixed in such proportions that the amount of magnesia in the final mixture is not substantially less than 1.34 times the silica plus 0.40 times the alumina in order to insure that there is present magnesia in quantity at least sufficient to convert all of the silica to magnesium ortho silicate (forsterite) and all of the alumina to magnesium aluminate (spinel). The mixture is heated to a temperature higher than that of incipient fusion of the non-refractory constituent. As the latter melts it reacts with the magnesia of the refractory constituent to form forsterite ($2MgO.SiO_2$) and spinel ($MgO.Al_2O_3$), both of which fuse only at much higher temperatures, and which with magnesia form no eutectic melting below 1700° C. As heating is continued, the non-refractory constituent is eliminated by reaction with the refractory granular material, and the result is a bonding together of the refractory granules to a load-bearing structure which does not even soften except at an extremely high temperature.

In order to secure the benefits of the invention it is essential to select both the refractory granular material and the relatively non-refractory material to be used within the particular composition ranges given.

Because of the tendency of calcareous materials to react with aluminous materials and form low-melting products which cannot be eliminated by heating with materials high in lime or magnesia, it is important that both the refractory and non-refractory constituents used in the practical application of this invention should be relatively low in lime. For the highest refractoriness in the product they should be entirely free from lime, but such raw materials as sea-water periclase, Washington, European and Manchurian magnesites, are, as marketed, sufficiently low in lime to permit their use, either as the refractory granular material to be bonded or in the preparation of the low-melting constituent to act as a bond. The presence of 1% of lime in the final product may result in the formation of 6 to 7% of liquid when the temperature is raised to 1700° C., but for many applications this is not particularly objectionable. In other applications it is advantageous to have all raw materials substantially lime-free.

Other impurities than lime are often objectionable if present in more than minor proportion, but the normal magnesias mentioned above are satisfactory in this respect. Within the limits already set out above, silica and alumina in the refractory constituent are not objectionable, and in the non-refractory constituent they are relied upon to form a low-melting material with the magnesia.

A characteristic of mixtures of the type coming within the scope of this invention is that when exposed to temperatures at or above the melting point of the non-refractory constituent they first become pasty, as this constituent melts, and then stiffen up as the reaction proceeds with the refractory granules; eventually the whole mass becomes quite hard. Within wide limits, the higher the temperature used, the harder will be the product, the reason being that progress towards ultimate equilibrium is more rapid and more nearly complete at the higher temperature.

The non-refractory constituent may be one or a combination of several natural minerals or rocks of suitable composition, or it may be preformed by any suitable method. Complete fusion can readily be brought about by heating raw materials of the desired over-all composition and physical character in water-jacketed blast furnaces (when coarse) or in reverberatory or electric furnaces (whether coarse or fine). Granulation in water is a cheap and convenient means of converting the non-refractory material to a suitable grain size. Fusion can, if desired, be brought about in rotary kilns, but when these are used it is customary to carry out the operation at such a temperature that sintering, shrinkage and nodulization of the fine charge occur without complete fusion. In such a case the reaction does not usually proceed to complete equilibrium, but sufficient liquid is formed to act as a strong bond upon cooling. After being cooled, the fused or clinkered product is crushed to the desired grain size for use as a non-refractory constituent in the bonding of the refractory granular material.

It has been found that the best results are obtained when the non-refractory constituent is substantially of a grain size within the range 6 to 20 mesh. When the material is coarser, drainage of the non-refractory constituent prior to reaction with the granular refractory is more likely to occur; when it is too fine (especially if fine material also occurs in the refractory constituent) the reaction may take place so rapidly that insufficient liquid exists at any one time to shrink the particles properly and bond them strongly together. Thus the use of very fine materials may result in a product which, while equally refractory, is relatively soft, and hence not satisfactory with respect to mechanical strength. The use of fine particles of non-refractory constituent is not objectionable when fines have been removed from the refractory portion.

Since the invention comprises a method of consolidating granular particles of refractory material, it follows that this material must not be wholly fine. There is, however, a considerable range of particles size which gives good results. For example, fettling materials sometimes consist of at least 50% by weight of particles coarser than 1/4", whereas in manufacturing brick it is customary to crush the raw materials until substantially all particles are below 1/4", or in some cases even below 1/8". Refractory materials to be bonded should preferably contain at least 50% by weight of grains coarser than 20 mesh.

The operation of the invention is illustrated by reference to the accompanying drawings in which, Figure 1 is a simplified form of the phase equilibrium diagram of the ternary system magnesia-alumina-silica, as published by the United States Steels Corporation, revised edition, April, 1943;

Figure 2 shows, for the same system, the ranges of composition of the non-refractory material of the invention which are (1) 100% and (2) 75% liquid at 1500° C., and Figure 3 particularly designates on the diagram the limits of the non-refractory material specifically defined herein and also the limits of composition of the refractory granular particles to be bonded.

These drawings facilitate a ready understanding of the scope of the invention. It will be observed (a) that the composition of the granular refractory material, on the basis of its content of magnesia, alumina and silica only, has a proportion of magnesia at least equal to 1.5 times the silica and 0.5 times the alumina, as shown by line 2, Figure 3, and lies appreciably below the forsterite-spinel join, line 1 on the diagram, and accordingly has excess magnesia above that required to form forsterite and spinel, which excess will combine with the silica and alumina of the non-refractory material, and (b) that the composition of the non-refractory material used to consolidate the refractory granules lies substantially within the hexagonal area A shown in Figure 3, and preferably within the hexagonal area B of the same figure. The forsterite-spinel join, line 1 Figure 3, corresponds to compositions in which the amount of magnesia is 1.34 times the silica plus 0.40 times the alumina.

*Example 1*

There is available in the form of granular refractory particles a synthetic material containing substantially 40% magnesia and 60% alumina, and it is desired to make a brick of this material having a strong ceramic bond, such as could not be secured from the particles alone without burning the brick at an excessively high temperature. There is also available, as a low-melting constituent, a siliceous talc containing substantially 16 MgO, 74 $SiO_2$, 7 FeO, 1 $Al_2O_3$, 1 CaO and 1% loss on ignition. It will be observed that the constituents magnesia, silica and alumina are present in the proportions 17.6; 81.3 and 1.1% respectively, a composition corresponding closely to corner z of the hexagonal area A of Fig. 3. The siliceous talc, partly because of the presence of the minor quantities of impurities, forms some liquid upon being heated to about 1350° C., and is substantially all molten at 1500. This material is crushed until at least 50% of it will pass a 6 mesh screen and be retained on 20 mesh, and 10 parts of it are mixed with 90 parts of the refractory granular particles which have been prepared by crushing them so that 60% is minus 6 plus 65 mesh and 40% minus 65 mesh. The whole is moistened with water and a suitable temporary bond, such as a concentrated lignin liquor, tempered in a wet pan and molded into brick, as in ordinary brick-making practice. The brick are then burned at 1500° C. Before this temperature has been reached substantially all the non-refractory constituent has been converted to liquid; this then gradually reacts with the excess magnesia of the refractory granules and is itself eliminated through the formation of refractory compounds. The final composition, on the basis of the magnesia, alumina and silica only, is about 37.9 magnesia, 54.6 alumina and 7.5% silica. This composition is not appreciably affected by the impurities of the siliceous talc, and the burned brick contains substantially only spinel and forsterite, which together form no liquid below 1700° C., and in the proportions present would not be wholly molten below 2000° C. By the method described there is produced at the ordinary temperature of burning, a ceramically bonded brick of exceptionally high refractoriness.

*Example 2*

It is desired to use in the formation of a refractory brick a granular sea water periclase containing substantially 93 magnesia, 5 silica and 2% lime. (For purposes of calculation, this may be taken as 95 magnesia and 5 silica.) It has been crushed until 20% remains on 6 mesh and about 25% is finer than 100 mesh. Its refractoriness is so high that it cannot be burned alone to a hard, dense brick except at 1600° C. or higher. In order to permit burning at a lower temperature, there are mixed with 75 parts of the granular sea water refractory 25 parts of minus 6 mesh granite, which contains 2.6 MgO, 13.0 $Al_2O_3$, 71.1 $SiO_2$, 2.5 $Fe_2O_3$, 1.8 FeO, 2.0 CaO, 4.0 $Na_2O$ and 3.0% $K_2O$, that is, magnesia, alumina and silica substantially in the proportions 3, 15 and 82%, respectively. These three constituents alone, which in composition correspond closely to corner $y$ of the hexagonal area A of Fig. 3, would in combination form 75% liquid at 1500° C., and actually, because of minor amounts of alkali, iron and other oxides present, begin to melt below 1300 and are wholly molten at about 1450° C. Mixed with the highly refractory sea water periclase and formed into brick by the usual means, the granite melts as above and then reacts with the periclase to form a mechanically strong brick consisting essentially (neglecting impurities) of 72 magnesia, 3.8 alumina and 24.2% silica, or 5.2 spinel, 56.5 forsterite and 38.3% periclase, which combination forms no liquid below 1700 and is not wholly molten below 2200° C.

In this case, syenite or diorite may be satisfactorily substituted for granite, provided that they are not undesirably high in lime, but the final product will then have a slightly different composition.

Example 3

A refractory granular material containing about 80 magnesia, 15 alumina and 5% silica is required to be bonded at the lowest feasible temperature to a mechanically strong and moderately refractorily lining for a laboratory furnace. As a bonding material there is selected nepheline syenite containing 60 silica and 24% alumina; it also contains enough soda and potash to lower the fusion point to about 1250° C. while initial liquid formation takes place below 1050. This is used after crushing to 20 mesh, and is incorporated to the extent of 15% of the total mixture. The mixed material is burned-in at 1250–1300° C., at which temperature a very strong ceramic bond is developed, and at ultimate equilibrium the major constituents magnesia, alumina and silica are present in proportions 69.6, 16.8 and 13.6%, respectively. These alone form no liquid below 1700° C., and, while appreciable quantities of alkalies occur in the low-melting constituent, these constitute only about 2% of the final mixture, and do not detract from its value as a refractory for use at moderate temperatures.

Example 4

There has been prepared from a naturally occurring magnesite a granular refractory containing magnesia, alumina and silica in the proportions 90, 4 and 6%, respectively, and this is to be bonded for use in brick manufacture. The usual procedure is followed except that there is incorporated in the material before tempering about 8% by weight of clay brick grog, made by crushing cull brick containing essentially 40 alumina and 60% silica until all passes 6 mesh and about 35% passes 20 mesh. Actually, minor proportions of other oxides in the grog, amounting to a total of about 5%, cause it to form initial liquid below 1400 and about 80% of liquid at 1500° C. The grog bonds the mass strongly when, upon heating the brick to 1500° C., it melts and reacts with the granules to form spinel and forsterite. The impurities in the grog, it will be observed, constitute only 0.4% of the final brick. The over-all chemical composition is substantially 83 magnesia, 7 alumina and 10% silica, and the corresponding mineralogical composition is 9.6 spinel, 24.1 forsterite and 66.3% periclase, one which is again highly refractory.

Good results are also obtained when the clay brick grog contains substantially equal proportions of silica and alumina, in which case the composition approximates the corner $x$ of the hexagonal area A of Figure 3.

Example 5

Granular magnesia almost 100% pure is available from careful selection and dead-burning of California magnesite, and it is desired to use this in making the monolithic hearth of a basic open hearth steel furnace. It is first crushed to pass 4 mesh, in which form it contains 30% of minus 20 mesh material. Eighty parts of this highly refractory magnesite are then mixed with 20 parts of minus 6 plus 20 mesh synthetic granules formed by sintering kyanite or bauxite, clay and magnesite to a product containing 15 magnesia, 50 alumina and 35% silica, and crushing and screening the sinter. It will be observed from Figs. 2 and 3 that this non-refractory product forms about 60% of liquid even at 1500° C., and that its composition lies at the corner $w$ of the hexagonal area A of Fig. 3. The mixture of the two materials is then thrown a little at a time into the open hearth furnace held at 1650° C., and is burned-in according to the usual practice. Fusion of the synthetic constituent occurs almost immediately, and it strongly bonds the refractory particles of magnesite together as it reacts with them and is itself eliminated. The ultimate product contains substantially 83 magnesia, 10 alumina and 7% silica, a composition which does not completely melt below 2600° C.

It is of interest to contrast such a hearth with one prepared in a similar way from mixtures of magnesite and open hearth slag, which is already highly basic, as has long been customary in the steel industry. In the slag, all of the acid constituents (including $SiO_2$, $P_2O_5$, $Al_2O_3$ and $Fe_2O_3$) are already present in combinations with lime from which they cannot be displaced by magnesia. The result is that no appreciable reaction takes place between the magnesite and slag, and, after burning is completed, the hearth still consists of particles of periclase embedded in slag of substantially the original composition. The latter will still melt at ordinary open hearth temperatures, and the bottom is therefore susceptible to physical erosion, whether from solid charge dropped into the furnace or from one of the occasional "boils" which, if not stopped by prompt tapping of the heat, often make a hole completely through the refractory lining and result in loss of the heat through the bottom. It will be recognized that much greater resistance is offered to the action of a boil when the refractory bottom is formed by the method and materials described in this example, and as a consequence of the elimination of liquid retains a substantial proportion of its mechanical strength even at the highest open hearth temperatures.

Example 6

It is also evident that the same combination of materials used in Example 5 can be applied in forming a refractory ramming mixture for use in open hearth or electric steel furnaces. In this case it is desirable to have about 50% of the granular refractory to be bonded crushed to pass 20 or even 40 mesh, in order that sufficient fines may be present to permit ramming the mixture to a mass of high density, but it is still desirable to have the non-refractory material present in larger granules, such as the minus 6 plus 20 mesh size previously specified. A bottom of this kind can be rammed without the addition of chemical bonds, such as are used in most ramming mixtures, for when heated, the non-refractory granules melt and bond the surface strongly together for a depth of some inches. Lower down, reaction may at first be incomplete, or even delayed until erosion of the original surface permits the heat to penetrate and bond the remaining material. The final composition is of course the same as in Example 5.

*Example 7*

In this example, the granules contain 80 magnesia, 10 alumina and 10% silica, and the low-melting bonding constituent is made by fusing 40 parts of serpentine with 60 of nepheline syenite. This combination gives the three constituents magnesia, alumina and silica (which constitute about 90% of the total weight) in almost the exact proportions of the eutectic melting at 1347° C.–20.3, 18.3 and 61.4%, respectively, and the composition is therefore a particularly favourable one for use as a bond at low temperatures. After being melted, it is granulated in water, as a convenient means of reducing it to substantially the desired grain size. Used in the proportions of one part to four of granules containing 80 magnesia, 10 alumina and 10% silica it produces a highly refractory material having these oxides present in proportions 69.5, 11.2 and 19.3%, respectively.

*Example 8*

Another eutectic in the magnesia-alumina-silica system, melting at 1362° C. and containing 25 magnesia, 21 alumina and 54% silica, can be closely approached in composition by sintering or melting together equal parts of natural olivine and kaolin. When 12 parts of this product are used to bond 88 parts of granules containing 60 magnesia, 30 alumina and 10% silica, fusion of the non-refractory constituent is easily effected, and the product contains the same oxides in substantially the proportions 56, 29 and 15% respectively. Such a composition can be fused to a liquid only at about 2000° C.

As will be evident from the magnesia-alumina-silica phase equilibrium diagram (Fig. 1) serpentine, talc or enstatite can be substituted for the olivine, and any aluminum silicate containing 45% of silica or more for the kaolin, and equal proportions by weight will still produce upon fusion a non-refractory constituent forming a high proportion of liquid even below 1400° C. Such low-melting materials are therefore particularly easy to make.

*Example 9*

Suitable non-refractory constituents can also be made substantially without alumina. For example, when serpentine, which is available as a waste product in the asbestos district of Quebec and contains about 38% each of magnesia and silica, is heated with enough silica to change the ratio of these oxides from 50:50 to 35:65, the composition of the 1547° eutectic between clinoenstatite (MgO.SiO$_2$) and silica is reached, and the effect of the iron oxide in the impure serpentine is to reduce the melting point below 1500° C. The composition in question is close to the corner $u$ of the hexagonal area A of Fig. 3. Using 15% of the product with 85% of synthetic granules containing 50% each of magnesia and alumina gives proportions of magnesia, alumina and silica in the final product substantially 48, 43 and 9%. In spite of the low magnesia content, such a material has a temperature of complete liquidity approaching 2000° C., with initial liquid formation about 1700. In this case it is not essential to form the exact composition of the 1547° eutectic between magnesia and silica, and good results are in fact obtained when the silica content of the non-refractory constituent, on the basis of magnesia and silica only, is kept in the range 60 to 70%. Obviously, any other magnesium silicate may be substituted for the serpentine.

*Example 10*

In forming the non-refractory constituent it may be convenient to use three or more raw materials, and one of these may in fact conveniently have the same composition as the granules to be bonded, as when a particular grain size of this refractory material is available in excess of the requirements for other purposes. For example, when the refractory granules contain 80 magnesia, 15 alumina and 5% silica, 50 parts may be fused with 30.6 parts of silica and 19.4 of a calcined bauxite containing 90 alumina and 10% silica to a non-refractory product with 40 magnesia, 25 alumina and 35% silica. This composition is at the corner $v$ of the hexagonal area A of Fig. 3. If, then, 25 parts of this low-melting material are used to bond 75 parts by weight of the original refractory granules, the ultimate product will contain substantially 70 magnesia, 17.5 alumina and 12.5% silica, which will attain complete liquidity only at about 2350° C., and will form no liquid below 1700. In this case, three highly refractory materials, of which one has the same composition as the granules to be bonded, have been combined to form the non-refractory constituent, and this has in turn been eliminated by reaction with more of the refractory granular material.

The above examples illustrate the very broad scope of the invention and the limits of composition of the non-refractory constituent within which good results have been obtained. These limits may be defined as comprising all compositions which, on the basis of their magnesia, alumina and silica contents alone (that is, neglecting minor proportions of lime, iron oxide, etc.) lie within the boundaries of the rectilinear hexagonal figure A in the magnesia-alumina-silica phase equilibrium diagram (Fig. 3) defined by the corners having compositions ($z$) 18 magnesia, 0 alumina, 82% silica, ($y$) 0 magnesia, 18 alumina, 82% silica, ($x$) 0 magnesia, 50 alumina, 50% silica, ($w$) 15 magnesia, 50 alumina, 35% silica, ($v$) 40 magnesia, 25 alumina, 35% silica and ($u$) 40 magnesia, 0 alumina and 60% silica. Compositions lying substantially outside this hexagonal area are too refractory to give good results when used as herein described.

The limits of composition of the non-refractory constituent, whether naturally occurring or preformed may also be approximately defined as including all combinations of magnesia, alumina and silica (with not more than 25% of all other compounds) which are at least substantially 75% molten at 1500° C. (Fig. 2).

A preferred, and somewhat smaller, range of composition of the non-refractory constituent is that which, on the same basis, lies within the boundaries of the rectilinear hexagonal figure B in the magnesia-alumina-silica phase equilibrium diagram (Fig. 3) defined by corners having the compositions (1) 19 magnesia, 7 alumina, 74% silica, (2) 7 magnesia, 19 alumina, 74% silica, (3) 7 magnesia, 37 alumina, 56% silica, (4) 17 magnesia, 37 alumina, 46% silica, (5) 32 magnesia, 22 alumina, 46% silica, and (6) 32 magnesia, 7 alumina, 61% silica. This hexagonal figure approximately defines the limits within which all commercial compositions are substantially 100% liquid at 1500° C.

For convenience in calculation it has been assumed in several of the examples that the non-refractory constituent consisted entirely of the oxides magnesia, alumina and silica. It will be appreciated, however, that, when using commercial or natural raw materials, minor amounts of other oxides, such as those of calcium, iron, titanium and the alkali metals, may be present. The invention is limited, however, to the use of non-refractory constituents, whether natural or synthetically preformed, which contain at least 75% of magnesia plus alumina plus silica.

In none of the preformed non-refractory constituents is any of the magnesia at ultimate equilibrium present as periclase. When they are rapidly cooled from the liquid condition, as by granulation in water, they form a glass, and when slowly solidified they crystallize to various silicates of magnesia and alumina, the nature of which depends upon the composition of the melt. In no case, however, does the magnesia crystallize as periclase, and this is important, since by using magnesia only in the combined form it is possible to produce materials which are at least substantially 75% liquid at 1347–1500° C., instead of being only somewhat plastic even at much higher temperatures, as disclosed in the prior art.

It is evident that, while the granular particles of refractory material to be bonded always contain a large proportion of oxide constituents in the magnesia-alumina-silica system, the presence of minor proportions of other oxides, such as those of iron, titanium and lime, is permissible. The invention is limited, however, to the bonding of refractory granular materials containing at least 80% by weight, on the dead-burned or loss-free basis, of magnesia, alumina and silica, and having a ratio of magnesia to silica and alumina at least equivalent to 1.5 times the silica plus 0.5 times the alumina. Preferably, the basic granular material to be bonded should contain at least 10% of free magnesia in excess of that required to form magnesium ortho-silicate with all the silica present and magnesium aluminate with all the alumina in the granules, and not more than 5% of lime.

In regard to the proportions of the non-refractory and refractory constituents to be used in any particular case, it will be observed from the examples given that these may vary widely. In the magnesia-alumina-silica system, however, a definite limit does exist, and use can be made only of those mixtures of non-refractory and refractory constituents which, in their over-all composition, contain sufficient magnesia to form forsterite with all the silica present and spinel with all the alumina, that is, the weight ratio of magnesia to silica and alumina must not be substantially less than 1.34 times the silica plus 0.40 times the alumina. Such materials, if pure and fully reacted, form no liquid below about 1700° C. Were appreciably less magnesia present, the over-all composition would be above the forsterite-spinel join (Fig. 1), and liquid would be formed in at least small quantities at a temperature of 1372° C. In the final product this is of course undesirable. To those versed in the art, it is a simple mathematical problem to calculate the proportions of the two materials which will give the desired result in any particular case. In most cases, it is advantageous to have in the final product more than the minimum amount of magnesia, as the presence of considerable excess magnesia brings about a still higher degree of refractoriness.

It will be readily understood that many specific applications of the method herein disclosed may be made. A number of these have been described in the several examples given above. The invention is not limited, however, to any particular fields of application, but only to the bonding of refractory granular particles by the use of siliceous non-refractory materials of the particular type herein described.

This application is a continuation-in-part of copending application S. N. 688,264, filed August 3, 1946, now Patent Number 2,568,237, issued September 18, 1951.

What is claimed is:

1. A method of consolidating refractory granular material into a mechanically strong and highly refractory product which comprises mixing refractory granular particles containing a total of at least 80% by weight of magnesia, silica and alumina and not more than 5% of lime, and in which the weight ratio of magnesia to silica and alumina is at least equal to 1.5 times the silica plus 0.5 times the alumina, with non-refractory material containing a total of at least 75% by weight of silica, magnesia and alumina of which substantially 35 to 82% is silica, 0 to 40% is magnesia, and 0 to 50% is alumina, the mixture of refractory and non-refractory materials having a weight ratio of magnesia to silica and alumina at least substantially equal to 1.34 times the silica plus 0.40 times the alumina, and heating the mixture to a temperature higher than that of incipient fusion of the non-refractory material to form liquid and coat the particles of granular refractory material and by reaction eliminate the non-refractory silicate and thereby bond the granules into a highly refractory and consolidated mass.

2. A method of consolidating granular refractory material into a mechanically strong and highly refractory product which comprises forming an intimate mixture of two types of materials, the first type consisting of basic refractory granular particles containing a total of at least 80% by weight of magnesia, silica and alumina and not more than 5% of lime and in which there is at least 10% by weight of the granular particles of free magnesia in excess of the amount required to form magnesium orthosilicate with all the silica and magnesium aluminate with all the alumina in the granules, and the second type consisting of non-refractory silicate containing a total of at least 75% by weight of silica, magnesia and alumina, of which substantially 35 to 82% is silica, 0 to 40% is magnesia and 0 to 50% is alumina, the said intimate mixture of basic granular refractory material and non-refractory silicate having a weight ratio of magnesia to silica and alumina at least substantially equal to 1.34 times the silica plus 0.4 times the alumina, heating the mixture to a temperature higher than that of incipient fusion of the non-refractory silicate to form liquid and coat the particles of granular refractory material and by reaction with their free magnesia convert the non-refractory silicate into magnesium orthosilicate and the alumina into magnesium aluminate and thereby bond the granules into a highly refractory and consolidated mass.

3. A method of consolidating refractory granular particles into a mechanically strong and highly refractory product which comprises mixing said granular particles consisting essentially of magnesia, alumina and silica in which the weight ratio of magnesia to silica and alumina is at least equivalent to 1.5 times the silica plus 0.5 times the alumina, with a non-refractory material having a composition within the range (1) 19 magnesia, 7 alumina, 74% silica, (2) 7 magnesia, 19 alumina, 74% silica, (3) 7 magnesia, 37 alumina, 56% silica, (4) 17 magnesia, 37 alumina, 46% silica, (5) 32 magnesia, 22 alumina, 46% silica, and (6) 32 magnesia, 7 alumina, 61% silica, the weight ratio of magnesia to silica and alumina in the mixture being at least substantially equal to 1.34 times the silica plus 0.40 times the alumina, and heating the mixture to a temperature higher than that of incipient fusion of the non-refractory material to form liquid to coat and react with the said granular refractory material and consolidate the mass.

4. A method as defined in claim 2 wherein the refractory granular material consists essentially of periclase.

5. A method as defined in claim 2 wherein the non-refractory silicate contains 2 to 40% magnesia in combined form and none as periclase.

6. A method as defined in claim 3 wherein the non-refractory silicate consists essentially of the magnesia-alumina-silica eutectic melting at about 1347° C. and containing substantially 20.3 magnesia, 18.3 alumina and 61.4% silica.

7. A method as defined in claim 3 wherein the non-refractory silicate consists essentially of the magnesia-alumina-silica eutectic melting at about 1362° C. and containing substantially 25 magnesia, 21 alumina and 54% silica.

8. A method as defined in claim 2 wherein the non-refractory silicate is at least one of a group consisting of granite, syenite and diorite.

9. A method as defined in claim 2 wherein the starting materials for the non-refractory silicate comprise substantially equal proportions of an aluminum silicate containing at least 45% of silica and one of a group consisting of olivine, serpentine, talc and enstatite.

10. A method as defined in claim 2 wherein the non-refractory silicate is formed by heating to a temperature higher than that of incipient fusion at least one of a group consisting of natural olivine, serpentine, talc and enstatite with silica to bring the silica content of the fired mixture within the range 60 to 70%.

11. A method as defined in claim 1 wherein the non-refractory material is preformed by at least incipient fusion.

12. A method as defined in claim 11 wherein the non-refractory material is at least substantially 75% molten at 1500° C.

13. A method as defined in claim 11 wherein the non-refractory material is at least substantially 100% molten at 1500° C.

14. A method as defined in claim 11 wherein the non-refractory material is granulated in water.

15. A method as defined in claim 1 wherein at least 50% by weight of the granular refractory particles are coarser than 20 mesh.

16. A method as defined in claim 1 wherein at least 50% by weight of the non-refractory material is coarser than 20 mesh.

17. A batch material for the preparation of refractory masses and shapes which comprises an intimate mixture of two types of materials, the first type consisting of basic refractory granular particles containing a total of at least 80% by weight of magnesia, silica and alumina and not more than 5% of lime and in which there is at least 10% of free magnesia in excess of the amount required to form magnesium orthosilicate with all the silica and magnesium aluminate with all the alumina in the granules, and the second type consisting of a non-refractory silicate containing a total of at least 75% by weight of silica, magnesia and alumina, of which substantially 35 to 82% is silica, 0 to 40% is magnesia and 0 to 50% is alumina, the said intimate mixture of basic granular refractory material and non-refractory silicate having a weight ratio of magnesia to silica and alumina at least substantially equal to 1.34 times the silica plus 0.4 times the alumina.

FRANK E. LATHE.

REFERENCES CITED

The following references are of record in the file of this patent:

UNITED STATES PATENTS

| Number | Name | Date |
| --- | --- | --- |
| 1,251,535 | Jones | Jan. 1, 1918 |
| 2,045,494 | Riddle | June 23, 1936 |

FOREIGN PATENTS

| Number | Country | Date |
| --- | --- | --- |
| 396,532 | Great Britain | 1933 |